United States Patent [19]

Horigome et al.

[11] Patent Number: 4,889,757

[45] Date of Patent: Dec. 26, 1989

[54] OPTICAL RECORDING DISK

[75] Inventors: Shinkichi Horigome, Tachikawa; Toshio Niihara, Hachiouji; Norio Ohta, Sayama; Yutaka Sugita, Tokorozawa; Yoshinori Miyamura, Tokyo; Ryoichi Sudo, Yokosuka; Hiroaki Miwa; Tetsuo Tajima, both of Fujisawa, all of Japan

[73] Assignee: Hitachi, Ltd., Tokyo, Japan

[21] Appl. No.: 16,349

[22] Filed: Feb. 19, 1987

[30] Foreign Application Priority Data

Feb. 19, 1986 [JP] Japan ................................. 61-32936

[51] Int. Cl.$^4$ .................................................. B32B 3/02
[52] U.S. Cl. ........................................ 428/64; 428/65; 428/693; 428/694; 428/695; 428/425.5; 428/704; 428/913; 430/945; 522/96; 522/103; 522/113; 369/283; 369/284; 369/286; 369/288; 427/54.1
[58] Field of Search ............... 428/65, 64, 693-695, 428/704, 425.5, 913; 430/945; 522/96, 103, 183; 369/283, 284, 286, 288; 427/54.1

[56] References Cited

U.S. PATENT DOCUMENTS

| | | | |
|---|---|---|---|
| 4,183,976 | 1/1980 | Yamada et al. | 427/131 |
| 4,425,570 | 1/1984 | Bell et al. | 430/19 |
| 4,442,159 | 4/1984 | Dezawa et al. | 427/131 |
| 4,446,549 | 5/1984 | Lippits et al. | 522/183 |
| 4,508,916 | 4/1985 | Newell et al. | 522/96 |
| 4,511,617 | 4/1985 | Hideyama et al. | 427/128 |
| 4,533,727 | 8/1985 | Gaku et al. | 428/413 |
| 4,547,419 | 10/1985 | Nishimatsu et al. | 427/131 |
| 4,562,105 | 12/1985 | Machida et al. | 428/161 |
| 4,569,881 | 2/1986 | Freese et al. | 428/213 |
| 4,614,705 | 9/1986 | Umehara | 428/64 |
| 4,668,550 | 5/1987 | Tajima et al. | 428/65 |
| 4,675,227 | 6/1987 | Kivits et al. | 428/195 |
| 4,680,742 | 7/1987 | Yamada et al. | 430/945 |
| 4,699,817 | 10/1987 | Fujiki et al. | 428/64 |
| 4,746,558 | 5/1988 | Simozawa et al | 428/141 |
| 4,775,603 | 10/1988 | Fujii | 428/694 |

FOREIGN PATENT DOCUMENTS

| | | | |
|---|---|---|---|
| 3421826 | 12/1985 | Fed. Rep. of Germany | 522/96 |
| 0133527 | 10/1979 | Japan | 522/96 |
| 1051018 | 3/1986 | Japan | 522/96 |
| 1185575 | 8/1986 | Japan | 522/183 |

OTHER PUBLICATIONS

Magneto Optical Recording on Amorphous Film, Imamura et al. IEEE Transactions on Magnetic, vol. 21, No. 5, pp. 1607-1612, 3-21-88.

Signal and Noise in Magneto Optical Readout, Mansuripur et al., J. Appl. Phys. 53(6), Jun. 82.

IBM Tech. Discl. Bull., vol. 16, No. 5, 10/73, p. 1442 Cuomo.

Primary Examiner—Henry F. Epstein
Assistant Examiner—P. J. Ryan
Attorney, Agent, or Firm—Antonelli, Terry & Wands

[57] ABSTRACT

In an optical recording disk wherein a resin layer cured with ultraviolet radiation is provided on a surface of a transparent substrate, the present invention consists in that a material having a heat distortion temperature of at least 65° C. is employed for the ultraviolet-cured resin layer. The appearance of wrinkles on a UV-cured resin surface is suppressed, whereby an optical recording disk of high carrier-to-noise ratio and long lifetime can be provided.

34 Claims, 1 Drawing Sheet

OPTICAL RECORDING DISK

BACKGROUND OF THE INVENTION

1. Field of the Invention

The present invention relates to optical recording disks, and more particularly to an optical recording disk well suited for erasable magnetooptical recording.

2. Description of the Prior Art

In a magnetooptic disk, a layer of ultraviolet-cured resin (hereinafter, called "UV-cured resin") is successively overlaid with a film of SiO or the like for enhancing the Kerr rotation angle, a recording film of TbFeCo system or the like, and a protective layer of SiO or the like. These films are formed by thermal evaporation or sputtering. Heretofore, such films have been, for example, ones described in 'Photographic Science and Engineering' 28, No. 3, 1984, p. 128.

In a case where, of the film forming methods, especially sputtering is employed for providing the enhancement film etc., microscopic wrinkles appear on the surface of the UV-cured resin layer. The wrinkles recur at periods of several—ten μm. They increase noise to drastically degrade the carrier-to-noise ratio (C/N ratio).

It has been found that the situation of appearance of the wrinkles differs depending upon the kind of the UV-cured resin material which forms a subbing layer. As a cause for the appearance of the wrinkles, the thermal property of the UV-cured resin material is pertinent. More specifically, the temperature of a substrate rises during the sputtering process, i.e., to about 100° C. The thin films of the inorganic materials having high stresses are stacked on the surface of the UV-cured resin layer which is in such a high temperature state. Accordingly, the UV-curable resin whose heat resistance is low is distorted to undergo wrinkles by the stresses.

SUMMARY OF THE INVENTION

An object of the present invention is to suppress the appearance of wrinkles of a UV-cured resin surface, thereby to provide an optical recording disk of high C/N ratio and long lifetime.

Various U/V-cured resin materials were studied. As a result, it has been revealed that the materials exhibiting heat distortion temperatures of at least 65° C. undergo no wrinkles.

The present invention accomplishes the object by employing a material the heat distortion temperature of which is not lower than about 65° C., for an ultraviolet-cured resin layer on the front surface of a transparent substrate.

These and other objects, features and advantages of the invention will become more apparent upon a reading of the following detailed specification and drawings.

DESCRIPTION OF THE PREFERRED EMBODIMENTS

The present invention consists in that a material which exhibits a heat distortion temperature of at least 65° C. is employed for a UV-cured resin layer on the front surface of a transparent substrate, thereby suppressing the appearance of the wrinkles of the front surface of the UV-cured resin and providing an optical recording disk of high C/N ratio and long lifetime.

Such materials are, for example, as stated below.

(1) An ultraviolet-curable resin composite which consists of 10–60% by weight of a compound indicated by the following formula (I) in which the ring structure shown is a cyclohexane ring and 90–40% by weight of a compound indicated by the following formula (II), and which is cured; or (2) An ultraviolet-curable resin composite which consists of 10–60% by weight of at least one compound selected from among compounds indicated by the following formula (III) and 90–40% by weight of the compound indicated by the following formula (II), and which is cured:

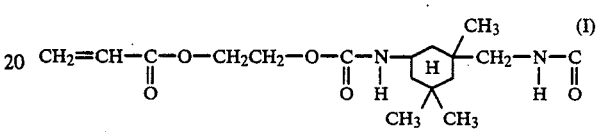

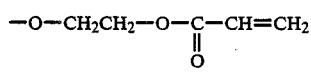

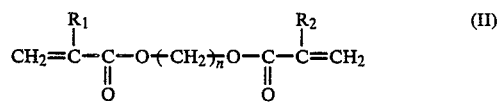

(where each of $R_1$ and $R_2$ denotes hydrogen or a methyl group, and n denotes an integer of n=5–12),

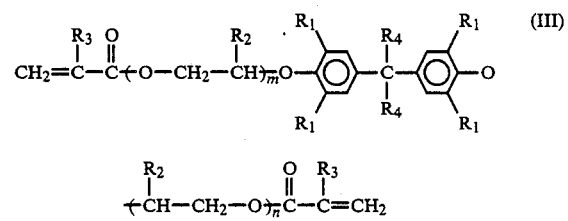

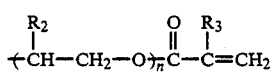

(where $R_1$ denotes hydrogen or halogen, $R_2$ denotes an alkyl group the number of carbon atoms of which is from 1 to 12, each of $R_3$ and $R_4$ denotes hydrogen or a methyl group, and m and n denote integers of m=1–4 and n=1–4). Each of the individual compounds (I), (II) and (III) is known.

Figure 1:
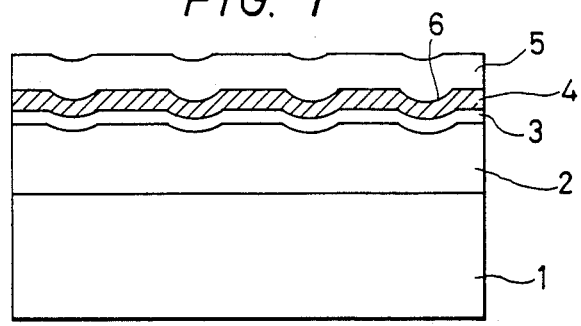
FIG. 1 is a conceptual cross-sectional view of an optical disk according to the present invention.

A case where the optical recording disk of the present invention is applied to a magnetooptical recording, will be described with reference to FIG. 1.

On a transparent substrate 1, there are successively stacked a UV-cured resin layer 2, a film 3 for enhancing the Kerr rotation angle, a magnetooptical film 4 and a protective layer 5. The UV-cured resin layer is required for providing grooves for tracking 6 or pits for sector signals on the surface of the substrate made of glass, epoxy resin, polymethyl methacrylate, or the like. A method for providing them is the 2P process (the photopolymerization process) in which the liquid of the UV-curable resin is spread between the transparent substrate and a stamper having grooves or signal pits and is then cured by irradiation with ultraviolet radiation, whereupon the substrate is stripped off from the stamper.

The UV-curable resin materials include acrylate polymers and thiol polymers, of which the former is extensively used at present. The UV-curable resin material for practical use is often composed of an acrylate prepolymer whose molecular weight is comparatively large, and an acrylate monomer whose molecular weight is small. As the prepolymers, there are various ones such as the compound (I) (urethan acrylate, specifically, reaction product of isophorone-di-isocyanate and 2-hydroxy ethyl acrylate) and compound (III) mentioned above. As the monomers, there are the aforementioned compound (II) and various others. The characteristics of the cured material to be obtained are determined by the properties of the prepolymer and the monomer themselves and the mixing ratio of them.

Besides, a photoinitiator having hitherto been employed can be used as it is. The mixing amount thereof is 0.1-5.0 parts by weight with respect to 100 parts by weight of the mixture of the resin composite. Examples of the photoinitiator are 1-hydroxycyclohexylphenylketone, benzophenone, acetophenonebenzyl, 1.1-dimethoxyacetophenone, and 2-ethylanthraquinone. One of the substances is singly used, or at least two of them are jointly used.

Subsequently, the enhancement film, magnetooptic film and protective layer are formed by sputtering or thermal evaporation on the surface of the UV-cured resin layer obtained as stated before. The enhancement film serves to enhance the Kerr rotation angle of the magnetooptic film owing to multiple reflection, and materials therefor are SiO, AlN, SiN, etc. This enhancement film is also effective to prevent the oxidation of the magnetooptic film. Materials for the magnetooptic film are a TbFeCo system, a GdTbFeCo system, etc. The protective layer is intended to prevent the oxidation of the magnetooptic film, and materials therefor are SiO, $SiO_2$, $Si_3N_4$, AlN, etc.

Now, examples of the present invention will be described in detail. Although the ensuing examples will refer to magnetooptical recording disks, the present invention is not restricted only to magnetooptical recording disks. The present invention is also applicable to abrasion type optical recording disks which are already commercially available or phase-change type optical recording disks.

EXAMPLE 1

Figure 2:
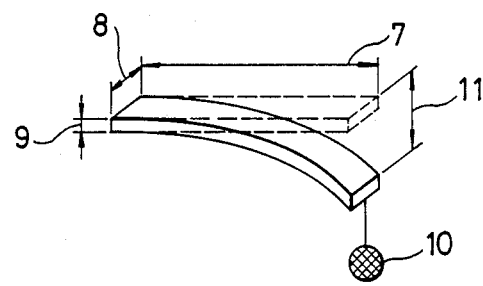
FIGS. 2 and 3 are diagrams for elucidating the measurement of heat distortion temperatures.

As UV-curable resin materials, the compound (I) and the compound (II) (where $R_1=R_2=CH_3$ and $n=6$) mentioned before were mixed at composition ratios listed in Table 1. Also, 2% by weight of 1-hydroxycyclohexylphenylketone was added to the mixtures as a photoinitiator. The liquid of the UV-curable resin at each composition ratio was sufficiently cured with a high pressure mercury lamp (of 4 kW), to prepare a cured piece having dimensions of 50 mm in length 7, 5 mm in width 8 and 1 mm in thickness 9. This sample for measuring a heat distortion temperature is shown in FIG. 2. As shown in FIG. 2, the part of 5 mm at one end was fixed, and a weight 10 of 10 gr. was suspended from the other end. After the sample was held at each of several temperatures for one hour, it was taken out and had the amount of distortion 11 measured. The degree of distortion was indicated as $$\frac{\text{the amount of distortion}}{\text{the length of the sample}} \times 100.$$

Figure 3:
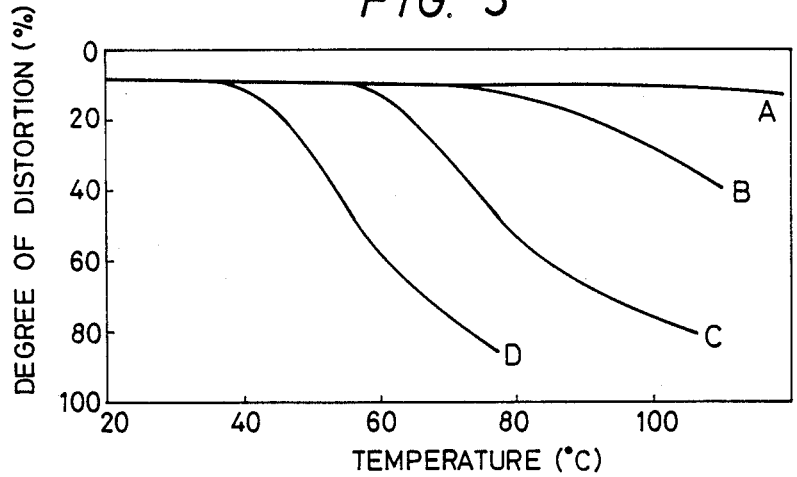

The measured results are illustrated in FIG. 3. In addition, the heat distortion temperatures obtained from this figure are listed in Table 1. On the other hand, each of the liquids of the UV-curable resins at the composition ratios A, B, C and D was placed on a nickel stamper separately prepared. A glass substrate was kept thereon so as to spread the UV-curable resin liquid on the whole surface of the substrate. After the resin liquid was cured by irradiating it by means of the high pressure mercury lamp of 4 kW for 30 seconds, the substrate was stripped off from the stamper. The thickness of the UV-cured resin layer was 20-30 μm. On the UV-cured resin layer thus obtained, an SiO film (100 nm thick) as an enhancement film, a TbFeCo film (100 nm thick) as a recording film, and SiO (150 nm thick) as a protective layer were successively stacked by sputtering, to obtain a sample for examining the situation of appearance of wrinkles. The examined results of such samples are listed in Table 1.

With the composite D the heat distortion temperature of which was 40° C., wrinkles appeared from the initial stage of the test. With the composite C the heat distortion temperature of which was 60° C., wrinkles did not appear initially, but they appeared with the lapse of time. With the composites B and A the heat distortion temperatures of which were 70° C. and 110° C. respectively, no wrinkle appeared, not only initially, but also when the samples were held at 100° C. for 1000 hours. It is understood from the above results that the UV-cured resin materials the heat distortion temperatures of which are not lower than about 65° C. are favorable. As the amount of the compound (II) is larger, the heat distortion temperature becomes higher, which is more desirable for preventing the appearance of wrinkles. However, when the amount of the compound (II) is larger than 90 parts by weight, the cured material becomes hard and fragile, and cracks come to appear in the UV-cured resin layer itself.

TABLE 1

| Composition | Composition ratio Compound (I) | Composition ratio Compound (II)[1] | Heat Distortion temp. | Situation of appear. of wrinkles[2] |
|---|---|---|---|---|
| A | 40 parts by wt. | 60 parts by wt. | 110° C. | o |
| B | 60 parts by wt. | 40 parts by wt. | 70° C. | o |
| C | 80 parts by wt. | 20 parts by wt. | 60° C. | Δ |
| D | 100 parts by wt. | 0 parts by wt. | 40° C. | x |

[1]Compound (II) ... $R_1 = R_2 = CH_3$, $n = 6$
[2]o: No wrinkle appeared.
Δ: Wrinkles appeared with the lapse of time.
x: Wrinkles appeared from the initial stage.

Meanwhile, substantially the same results were obtained in case of composites which consisted of the compounds (III) and (II). That is, the compound (III) (where $R_1=H$, $R_2=R_3=R_4=CH_3$ and $m=n=1$, i.e. dimethacrylate of bisphenol A-propyleneglycole additional product) and the compound (II) (where $R_1=R_2=CH_3$ and $n=6$) were mixed at composition ratio of 60 parts by wt. (compound (III)) and 40 parts by wt. (compound (II)). In this case, the heat distortion temperature was 70° C. No wrinkle appeared, not only initially, but also when the samples were held at 100° C. for 1000 hours.

EXAMPLE 2

40 parts by weight of the compound (I) and 60 parts by weight of the compound (II) of $R_1=R_2=CH_3$ and $n=6$ were mixed as a UV-curable resin material, and 2% by weight of 1-hydroxycyclohexylphenylketone was added to the mixture as a photoinitiator. The resulting material had a viscosity of about 40 centipoises. The liquid of the UV-curable resin was placed on a nickel stamper separately prepared, and an epoxy resin substrate or glass substrate which was 130 mm in diameter and 1.2 mm in thickness was put on the resin liquid and then depressed. Thus, the UV-curable resin liquid spread on the whole surface of the substrate. In this case, the surface of the epoxy resin substrate was subjected to a primer treatment, while that of the glass substrate was subjected to a treatment with silane-coupling reagents. Subsequently, the resin liquid was cured by irradiating it by means of a high pressure mercury lamp of 4 kW for 30 seconds. Thereafter, the substrate was stripped off at the interface between the stamper and the UV-cured resin layer. The thickness of the UV-cured resin layer was 20–30 μm. Subsequently, the substrate with the UV-cured resin layer was introduced into an in-line sputtering system. An SiO film 100 nm thick was deposited at the first step, a $Tb_{28}Fe_{60}Co_{12}$ film 100 nm thick at the next step, and an SiO film 150 nm thick as a protective layer at the last step. The pressure of argon gas on this occasion was 10 mm Torr.

In the disks thus obtained, wrinkled patterns were not observed. In case of rotating the disks of 5 inches at 1800 r. p. m., C/N ratios were about 55 dB in the tests of recording with pulses which had a frequency of 1.8 MHz and a duration of 100 n. sec. Even when the disks were held at 100° C. for 1500 hours, wrinkles did not appear, and the C/N ratios were almost the same as the value at the initial stage. Besides, even when the disks were held under the conditions of a temperature of 60° C. and a relative humidity of 95% for 1500 hours, the appearance of wrinkles was not observed, and noise levels did not rise. Such results were hardly different between the glass substrate and the epoxy resin substrate.

As described above, according to the present invention, an ultraviolet-cured resin of high heat distortion temperature is employed, whereby the appearance of microscopic wrinkles in a magnetooptic film can be prevented, and an optical recording disk of high C/N ratio and long lifetime can be provided.

What is claimed is:

1. An optical recording disk comprising a transparent substrate; a layer of an ultraviolet-cured resin provided on a surface of said transparent substrate; and a recording film provided over said layer of ultraviolet-cured resin; wherein a material whose heat distortion temperature is not lower than about 65° C. is employed as the ultraviolet-cured resin.

2. An optical recording disk as defined in claim 1, wherein said ultraviolet-cured resin is an ultraviolet-curable resin composite which is composed of 100 parts by weight of a mixture consisting of 10–60 parts by weight of a compound indicated by the following formula (I) and 90–40 parts by weight of a compound indicated by the following formula (II), and 0.1–5.0 parts by weight of a photoinitiator mixed in 100 parts by weight of said mixture, and which is cured:

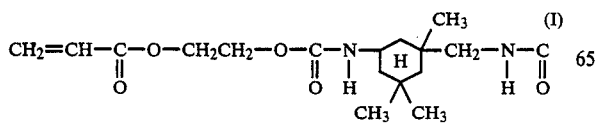

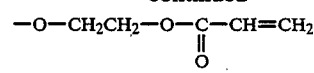

(where each of $R_1$ and $R_2$ denotes hydrogen or a methyl group, and n denotes an integer of n=5–12).

3. An optical recording disk as defined in claim 1, wherein said ultraviolet-cured resin is an ultraviolet-curable resin composite which is compoxsed of 100 parts by weight of a mixture consisting of 10–60 parts by weight of at least one member selected from the group consisting of compounds indicated by the following formula (III) and 90–40 parts by weight of a compound indicated by the following formula (II), and 0.1–5.0 parts by weight of a photoinitiator mixed in 100 parts by weight of said mixture, and which is cured:

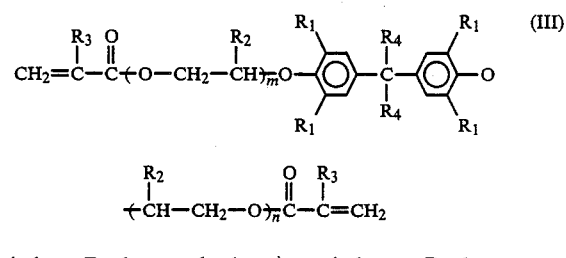

(where $R_1$ denotes hydrogen or halogen, $R_2$ denotes an alkyl group whose number of carbon atoms is from 1 to 12, each of $R_3$ and $R_4$ denotes hydrogen or a methyl group, and m and n denote integers of m=1–4 and n=1–4), and

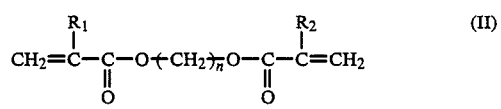

(where each of $R_1$ and $R_2$ denotes hydrogen or a methyl group, and n denotes an integer of n=5–12).

4. An optical recording disk as defined in claim 1, wherein said ultraviolet-cured resin in an ultraviolet-curable resin composite which is composed of a mixture consisting essentially of 10–60 parts by weight of a compound indicated by the following formula (I) and 90–40 parts by weight of a compound indicated by the following formula (II), and which is cured:

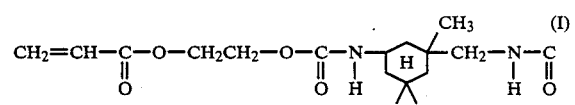

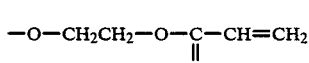

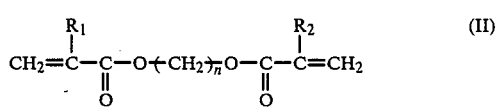

(where each of $R_1$ and $R_2$ denotes hydrogen or a methyl group, and n denotes an integer of n=5–12).

5. An optical recording disk as defined in claim 1, wherein said ultraviolet-cured resin is an ultraviolet-curable resin composite which is composed of a mixture consisting essentially of 10–60 parts by weight of at least one member selected from the group consisting of compounds indicated by the following formula (III) and 90–40 parts by weight of a compound indicated by the following formula (II), and which is cured:

$$CH_2=\underset{R_3}{C}-\underset{O}{\overset{O}{C}}(O-CH_2-\underset{R_2}{CH})_m O-\underset{R_1}{\overset{R_1}{\underset{|}{\bigcirc}}}-\underset{R_4}{\overset{R_4}{C}}-\underset{R_1}{\overset{R_1}{\underset{|}{\bigcirc}}}-O \quad (III)$$

$$(\underset{R_2}{CH}-CH_2-O)_n \underset{O}{\overset{O}{C}}-\underset{R_3}{C}=CH_2$$

(where $R_1$ denotes hydrogen or halogen, $R_2$ denotes an alkyl group whose number of carbon atoms is from 1 to 12, each of $R_3$ and $R_4$ denotes hydrogen or a methyl group, and m and n denote integers of m=1–4 and n=1–4), and $$CH_2=\underset{\overset{||}{O}}{\overset{R_1}{C}}-C-O(CH_2)_n O-\underset{\overset{||}{O}}{\overset{R_2}{C}}-C=CH_2 \quad (II)$$

(where each of $R_1$ and $R_2$ denotes hydrogen or a methyl group, and n denotes an integer of n=5–12).

6. An optical recording disk as defined in claim 1, wherein said recording film is a magneto-optic film.

7. An optical recording disk as defined in claim 6, wherein said magneto-optic film is made of a TbFeCo system.

8. An optical recording disk as defined in claim 6, wherein said magneto-optic film is made of a GdTbFeCo system.

9. An optical recording disk as defined in claim 6, further comprising an enhancement film for enhancing a Kerr rotation angle and for preventing oxidation of said magneto-optic film, said enhancement film being provided on said layer of ultraviolet-cured rsin, and said recording film being provided on said enhancement film.

10. An optical recording disk as defined in claim 9, wherein said enhancement film is selected from the group consisting of SiO, AlN and SiN.

11. An optical recording disk as defined in claim 1, further comprising a protective layer provided on said recording film.

12. An optical recording disk as defined in claim 11, wherein said protective layer is made of a material selected from the group selected from SiO, $SiO_2$, $Si_3N_4$ and AlN.

13. An optical recording disk as defined in claim 1, wherein an upper surface of said layer of ultraviolet-cured resin is provided with tracking grooves.

14. An optical recording disk as defined in claim 1, wherein an upper surface of said layer of ultraviolet-cured resin is provided with signal pits.

15. An optical recording disk as defined in claim 2, wherein said recording film is a magneto-optic film.

16. An optical recording disk as defined in claim 15, wherein said magneto-optic film is made of a TbFeCo system.

17. An optical recording disk as defined in claim 15, wherein said magneto-optic film is made of a GdTbFeCo system.

18. An optical recording disk as defined in claim 15, further comprising an enhancement film for enhancing a Kerr rotation angle and for preventing oxidation of said magneto-optic film, said enhancement film being provided on said layer of ultraviolet-cured resin, and said recording film being provided on said enhancement film.

19. An optical recording disk as defined in claim 18, wherein said enhancement film is selected from the group consisting of SiO, AlN and SiN.

20. An optical recording disk as defined in claim 3, wherein said recording film is a magneto-optic film.

21. An optical recording disk as defined in claim 20, wherein said magneto-optic film is made of a TbFeCo system.

22. An optical recording disk as defined in claim 20, wherein said magneto-optic film is made of a GdTbFeCo system.

23. An optical recording disk as defined in claim 20, further comprising an enhancement film for enhancing a Kerr rotation angle and for preventing oxidation of said magneto-optic film, said enhancement film being provided on said layer of ultraviolet-cured resin, and said recording film being provided on said enhancement film.

24. An optical recording disk as defined in claim 23, wherein said enhancement film is selected from the group consisting of SiO, AlN and SiN.

25. An optical recording disk as defined in claim 4, wherein said recording film is a magneto-optic film.

26. An optical recording disk as defined in claim 25, wherein said magneto-optic film is made of a TbFeCo system.

27. An optical recording disk as defined in claim 25, wherein said magneto-optic film is made of a GdTbFeCo system.

28. An optical recording disk as defined in claim 25, further comprising an enhancement film for enhancing a Kerr rotation angle and for preventing oxidation of said magneto-optic film, said enhancement film being provided on said layer of ultraviolet-cured resin, and said recording film being provided on said enhancement film.

29. An optical recording disk as defined in claim 28, wherein said enhancement film is selected from the group consisting of SiO, AlN and SiN.

30. An optical recording disk as defined in claim 5, wherein said recording film is a magneto-optic film.

31. An optical recording disk as defined in claim 30, wherein said magneto-optic film is made of a TbFeCo system.

32. An optical recording disk as defined in claim 30, wherein said magneto-optic film is made of a GdTbFeCo system.

33. An optical recording disk as defined in claim 30, further comprising an enhancement film for enhancing a Kerr rotation angle and for preventing oxidation of said magneto-optic film, said enhancement film being provided on said layer of ultraviolet-cured resin, and said recording film being provided on said enhancement film.

34. An optical recording disk as defined in claim 33, wherein said enhancement film is selected from the group consisting of SiO, AlN and SiN.

* * * * *